(12) United States Patent
Putterman et al.

(10) Patent No.: US 9,826,279 B2
(45) Date of Patent: Nov. 21, 2017

(54) WINDOWS MANAGEMENT IN A TELEVISION ENVIRONMENT

(71) Applicant: Rovi Solutions Corporation, Santa Clara, CA (US)

(72) Inventors: Daniel Putterman, San Francisco, CA (US); Brad Dietrich, San Francisco, CA (US); Gregory Peters, Los Gatos, CA (US); Richard Bullwinkle, Palo Alto, CA (US)

(73) Assignee: ROVI SOLUTIONS CORPORATION, San Carlos, CA (US)

( * ) Notice: Subject to any disclaimer, the term of this patent is extended or adjusted under 35 U.S.C. 154(b) by 0 days.

(21) Appl. No.: 14/607,181

(22) Filed: Jan. 28, 2015

(65) Prior Publication Data

US 2015/0156555 A1  Jun. 4, 2015

Related U.S. Application Data

(63) Continuation of application No. 13/361,657, filed on Jan. 30, 2012, now Pat. No. 8,976,297, which is a continuation of application No. 11/318,767, filed on Dec. 27, 2005, now Pat. No. 8,107,010.

(60) Provisional application No. 60/641,882, filed on Jan. 5, 2005.

(51) Int. Cl.
| | |
|---|---|
| H04N 21/485 | (2011.01) |
| H04N 5/445 | (2011.01) |
| H04N 9/74 | (2006.01) |
| H04N 21/431 | (2011.01) |
| H04N 21/436 | (2011.01) |
| H04N 21/443 | (2011.01) |
| H04N 21/422 | (2011.01) |
| H04N 21/439 | (2011.01) |

(52) U.S. Cl.
CPC ..... *H04N 21/4858* (2013.01); *H04N 5/44591* (2013.01); *H04N 9/74* (2013.01); *H04N 21/42204* (2013.01); *H04N 21/4316* (2013.01); *H04N 21/4396* (2013.01); *H04N 21/43615* (2013.01); *H04N 21/4438* (2013.01)

(58) Field of Classification Search
USPC .................................................. 348/563–567
See application file for complete search history.

(56) References Cited

U.S. PATENT DOCUMENTS

| | | | | |
|---|---|---|---|---|
| 6,097,380 | A | 8/2000 | Crites et al. | |
| 8,107,010 | B2 * | 1/2012 | Putterman | H04N 5/44591 |
| | | | | 348/563 |
| 8,976,297 | B2 * | 3/2015 | Putterman | H04N 5/44591 |
| | | | | 348/563 |
| 2003/0229900 | A1 * | 12/2003 | Reisman | G06F 17/30873 |
| | | | | 725/87 |
| 2003/0231868 | A1 * | 12/2003 | Herley | H04H 60/56 |
| | | | | 386/250 |

(Continued)

*Primary Examiner* — Paulos M Natnael
(74) *Attorney, Agent, or Firm* — Haley Guiliano LLP

(57) ABSTRACT

Media content is received in a windows management application. The media content is from a set of content including zero or more television signal content and zero or more application content. The media content is incorporated into a television signal containing a window configuration. The television signal is then sent from the windows management application to a television where it is displayed.

18 Claims, 7 Drawing Sheets

(56) References Cited

U.S. PATENT DOCUMENTS

| | | | |
|---|---|---|---|
| 2003/0233661 A1* | 12/2003 | Fisher | H04N 5/445 |
| | | | 725/90 |
| 2004/0001160 A1* | 1/2004 | Herley | H04H 60/56 |
| | | | 348/465 |
| 2004/0210847 A1* | 10/2004 | Berson | G01D 7/08 |
| | | | 715/788 |
| 2005/0066352 A1* | 3/2005 | Herley | H04N 7/16 |
| | | | 725/19 |
| 2007/0089157 A1* | 4/2007 | Clark | H04L 12/2803 |
| | | | 725/135 |
| 2007/0169158 A1* | 7/2007 | Folgner | G06F 17/30017 |
| | | | 725/90 |
| 2007/0179979 A1* | 8/2007 | Folgner | G06F 17/30017 |
| 2007/0239787 A1* | 10/2007 | Cunningham | G06F 3/04817 |
| 2008/0215620 A1* | 9/2008 | Folgner | G06Q 10/10 |
| 2009/0103835 A1* | 4/2009 | Folgner | G06F 17/30905 |
| | | | 382/299 |
| 2012/0054026 A1* | 3/2012 | Robinson | G06Q 30/02 |
| | | | 705/14.49 |
| 2012/0174039 A1* | 7/2012 | Rhoads | H04N 21/4312 |
| | | | 715/854 |
| 2014/0049555 A1* | 2/2014 | Bzdusek | G06T 7/0014 |
| | | | 345/589 |

* cited by examiner

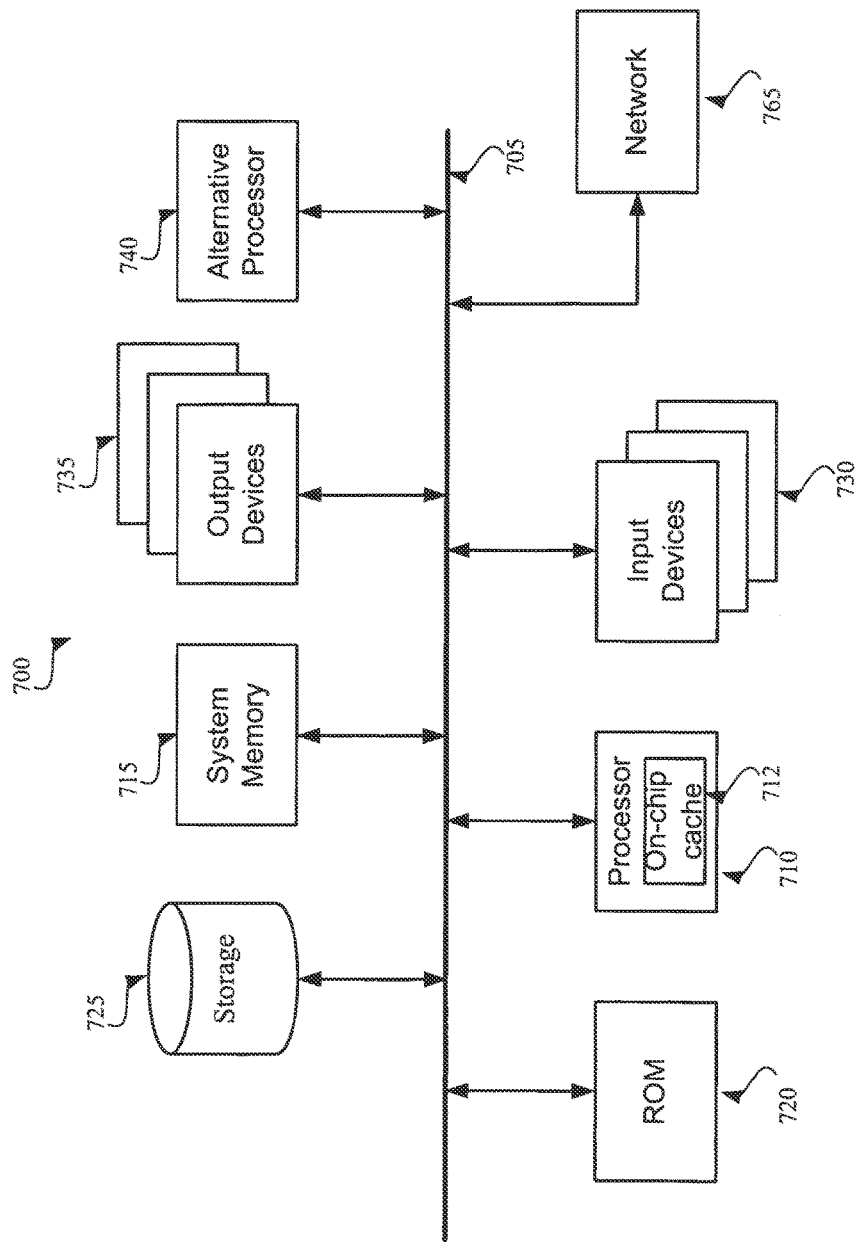

WINDOWS MANAGEMENT IN A TELEVISION ENVIRONMENT

RELATED APPLICATIONS

This patent application is a continuation of U.S. application Ser. No. 13/361,657, filed Jan. 30, 2012, which is a continuation of U.S. application Ser. No. 11/318,767, filed Dec. 27, 2005 (now U.S. Pat. No. 8,107,010); which claims the benefit of U.S. Provisional Application No. 60/641,882, filed Jan. 5, 2005. The specifications of the foregoing applications are hereby incorporated by reference herein in their entirety.

FIELD OF THE INVENTION

The present invention relates generally to a user's interaction with a television to control the display of content on the television. The present invention relates more specifically to a television environment system that permits a user to display a broad spectrum of media content in separate windows of an interface displayed on the television.

BACKGROUND

Television surrounds American lives. About 98.3% of the homes in the United States have television sets, with an average of 2.2 sets per household. Television is turned on more than seven hours per day in the average home, with each individual watching approximately four and a half hours per day.

High definition televisions are a recent addition to the suite of televisions available for home usage. With 1080 lines per picture and a screen aspect ratio (width to height ratio) of 16:9 (compared to 525 lines per picture and a 4:3 screen aspect ratio of standard definition television), high definition televisions provide more resolution than standard definition television (SDTV). The crystal-clear quality widescreen picture and compact-disc quality surround sound have made high definition televisions the future of television.

Users of televisions have become accustomed to some of the screen area being taken up by more than one image window, such as during picture-in-picture and picture-by-picture viewing. Once picture-in-picture or picture-by-picture viewing is selected by the television user, the content provider and not the television user controls the content received in each picture window.

The screen area of a television may be put to better use than at present. For example, a user may desire to have a music application up in one window to play music and have a cooking application up in another window to display a favorite recipe. However, because the content provider controls the content received, a user is unable to select a music application to play in one window and a picture or movie application to play in the second window. Thus, a conventional television is unable to present such desired content.

With the advent of applications which execute remotely, there will be a very large suite of applications available to a user. Some of these remote applications will allow interaction with media content. Users of conventional televisions are unable to take advantage of these remoted applications. What is needed is a system that permits a television user to select and display a broad spectrum of media and applications content on a home television.

SUMMARY

A system is provided that gives a viewer of a television more flexibility—like that of a personal computer—when watching television, but in a more television-centric way. In some embodiments, the television is a standard definition television or a high definition television. In other embodiments, the television has a different resolution and/or different aspect ratio than the format of the output of the application.

The user may select different media content to be displayed in separate windows, for example, one or more live television content feeds and one or more application content feeds. An application may comprise a multimedia application, internet-based application, or other application. For example, the application may comprise a music application, a still photo application, a video application, a television broadcast application, an email application, web browser application, or the like.

The user may also select a window configuration from a variety of window configurations. In some embodiments, each window configuration comprises two or more windows that are positioned and sized according to predetermined settings for the window configuration. Each window displays different selected media content. The user may also move the windows around on the television screen and may overlap the windows. Thus, the user may have the ability to control on a television screen two or more different applications as they would on a personal computer with a user interface that makes sense on a television and with which a television viewer is familiar.

Media content is received in a windows management application. The media content is from a set of content including live television signal content and application content. The media content is incorporated into a television signal in a user specified window configuration. In turn, the television signal from the windows management application is transmitted to a television for display to the viewer.

BRIEF DESCRIPTION OF THE DRAWINGS

FIG. 7 is a computer system 700 with which some embodiments of the invention are implemented.

DETAILED DESCRIPTION

Figure 1:
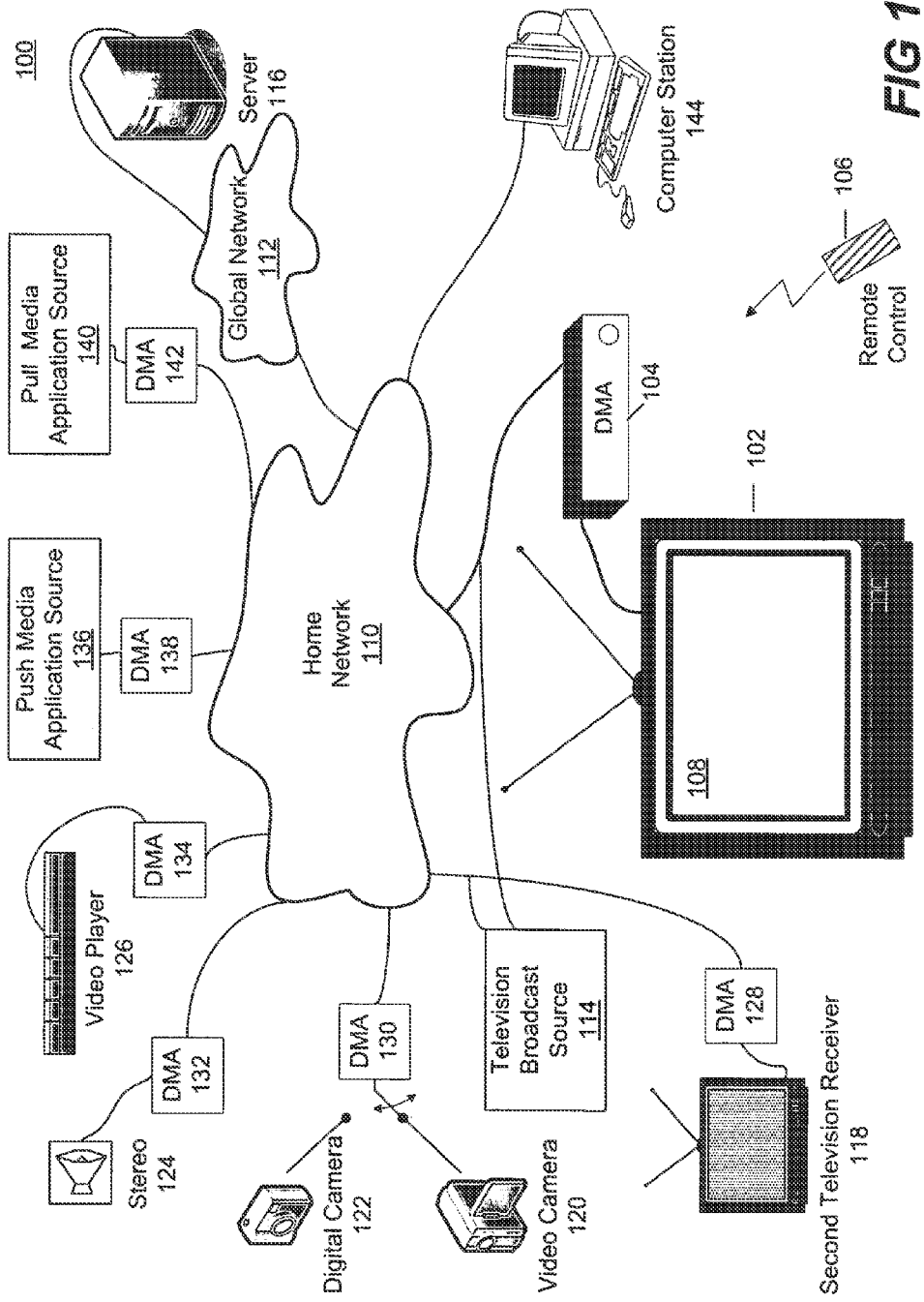
FIG. 1 illustrates one embodiment of a television environment 100.

FIG. 1 illustrates one embodiment of a television environment 100. Television environment 100 comprises a television 102, digital media adaptor 104, and a remote control 106.

Television 102 by itself may be thought of as an unintelligent device. When television 102 receives an electronic video signal, it converts the signal to television pictures and associated sound, and displays the television pictures as a normal image on a screen 108 of the television 102. In one embodiment, television 102 may be configured to display a second image onto or next to the normal image. For example, television 102 may have picture-in-picture or picture-by-picture, splitscreen, options. However, neither picture-in-picture (PIP) nor picture-by-picture has a single unifying aspect. Without more, television 102 presents the picture-in-picture and picture-by-picture on an input basis rather than on an application basis. Because of this, a conventional television 102 by itself lacks intelligence to manage window panels.

The terms "push media" and "pull media" may be used to distinguish television 102 from a computer server. Push media is a form of media distribution where items of content are sent to a user in a sequence having a particular rate determined by a server to which the user has connected. Push media usually entails some notion of a "channel" that the user may select and which may deliver a particular kind of content. This is in contrast to pull media, in which the user may request each item of content individually, such as with a computer.

A conventional television is an example of a device used with push media: a user may select a channel that delivers streaming television programs and commercials that are displayed on the television screen according to a television broadcast standard. In contrast, a computer connected to the Internet may represent an example of a device used with pull media: each item of content (e.g., web page) is sent to the computer only after a user requests the item.

In some embodiments, television 102 is a high definition television (HDTV) with 1,080 lines per picture and a screen aspect ratio of 16:9. In other embodiments, television 102 is a standard definition television (SDTV) with 525 lines per picture and a 4:3 screen aspect ratio. In further embodiments, television 102 is a television with a different resolution and/or different aspect ratio.

Digital media adaptor (DMA) 104 is a device that acts as a bridge between television 102 and media content. In one embodiment, DMA 104 is a box attached to television 102. In another embodiment, DMA 104 is software embodied in specific circuitry that is included inside television 102.

DMA 104 is connected to a home network 110, which is connected to a global network 112. Home network 110 and global network 112 may include a collection of computers interconnected by telephone lines, coaxial cables, satellite links, radio, wireless/broadband wireless, cellular telephone, PCS digital cellular, and/or some other communication or network technique. Home network 110 and global network 112 may include a public distribution network such as the Internet or include a private distribution network, such as a cable television network.

When used in conjunction with television 102, DMA 104 adds several functions to television 102. For example, most countries use one of three television broadcast standards: National Television System Committee (NTSC), Phase Alternating Line (PAL), or Sequential Color with Memory (or Systeme Electronique Couleur Avec Memoire) (SECAM). However, each television broadcast standard is incompatible with the other. Overcoming this incompatibility, DMA 138 may receive a NTSC, PAL, or SECAM signal from television broadcast source 114 and pass through a signal capable of being displayed on television 102 (which may only be able to display one of these broadcast standards). In this way, specific circuitry in DMA 138 enables television 102 to receive and display two or more television broadcast standards.

Television 102 may be designed to display one aspect ratio, namely the aspect ratio of the received electronic video signal. DMA 104 may include software embodied in specific circuitry to allow display of received signals having different aspect ratios. For example, if television 102 has a narrow aspect ratio display and a wide aspect ratio signal is received from television broadcast source 114, DMA 104 selects a narrow aspect ratio section from the wide aspect ratio signal for display on television 102. DMA 104 may expand or otherwise alter a received narrow aspect ratio signal where television 102 has a wide aspect ratio display. In general, the circuitry and/or software of DMA 104 changes a second signal standard to make it displayable according to the first signal standard by which television 102 operates.

In addition to the functions above, DMA 104 may locate and run remote services to play back video with audio at various speeds. DMA 104 may pause streamed clips indefinitely, jump to a particular time point in a file, and jump forward and back in predefined time increments (e.g., 15 minute increments). Moreover, DMA 104 may include a skip forward option (e.g., thirty second skip).

DMA 104 is not limited to receiving and processing television signal content. DMA 104 may also be able to access a local or remote application and cause that application to produce application content for display on television 102. DMA 104 may be connected to a variety of devices in a household. For example, DMA 104 may be connected to a second television 118, a video camera 120, a digital camera 122, a stereo 124, and a video player 126 through home network 110 and optionally through respective DMA 128, DMA 130, DMA 132, and DMA 134. Some household devices, such as video camera 120 and digital camera 122 may share a DMA (e.g., DMA 130), with the aid of a switch. Each DMA, including DMA 104, may be a client in a peer-to-peer or client-to-client network. Each device may also have access to media content particular to that device. Through home network 110 and a respective DMA, DMA 104 may have access to any media content stored or played from another device, such as video camera 120, digital camera 122, stereo 124, and/or video player 126.

In addition, DMA 104 may have access to other application programs, including those designed to perform a specific function directly for a user of television environment 100 or, in some cases, for another application program. As illustrated in FIG. 1, DMA 104 is connected to a push media application source 136 through optional DMA 138, a pull media application source 140 through optional DMA 142, and an optional computer station 144. In addition to signals from these media content sources, DMA 104 may receive signals from pre-tuned composite and S/Video sources, stereo left/right, and optical audio sources, including television broadcast source 114.

As described above, DMA 104 may be configured to accept a variety of media content including television signal content and application content. DMA 104 may be configured to determine the location of the media content and to gather and display particular media content on the screen 108 of television 102.

When used in conjunction with television 102, DMA 104 further adds additional functions to television 102. In some embodiments, DMA 104 enables television 102 to display multiple media items of content in different windows. In these embodiments, DMA 104 includes specific circuitry and/or software for processing one or more items of television signal content and/or one or more items of application content and for displaying the content on screen 108 of television 102.

As such, television 102 combined with DMA 104 creates a hybrid push media/pull media device to receive both television content and application content. On the push media side, television signal content is sent to television 102 in a sequence having a particular rate determined by a server to which television 102 is connected. In some embodiments, DMA 104 provides television 102 additional functionality in controlling this television signal content. On the pull media side, media content made up of television content and application content is requested by a user through DMA 104 and received by DMA 104 from local or remote applications controlled or operated at least in part by DMA 104.

DMA 104 may output video and audio to television 102 in a variety of formats. DMA 104 may output television signal content in different video formats (e.g., Composite, S/Video, Component, and High-Definition Multimedia Interface (HDMI)) simultaneously. If needed, DMA 104 may also scale the video to a different size for television 102 (e.g., from full screen down to a smaller window, such as 6×4 inches). In one embodiment, video scaling is done as part of a setup procedure for DMA 104. A hardware switch on DMA 104 may set the video output resolution. This switch may also be embodied in the software configuration of DMA 104. DMA 104 may also output audio in a variety of formats (e.g., as digital output, stereo left/right, etc.) simultaneously.

Television environment 100 also includes remote control 106. Remote control 106 includes any device used to control television 102 or DMA 104 from a distance. Preferably, remote control 106 includes push buttons that provide input selection and include a communication head that transmits user selected inputs to DMA 104.

In some embodiments, television environment 100 includes a client-server mechanism. The client portion may be implemented using DMA 104. DMA 104 functions as a client in the client-server environment to interface media devices to home network 110. For example, second television 118, stereo 124, video player 126, a game program, and an electronic photo album may be coupled to DMA 104 through their respective DMAs to provide the full functionality of their services through home network 110 to television 102. The server portion may be implemented using a computer or a media server device. For example, computer station 144 or server 116 may function as a server in the client-server environment to serve data stored on that system or to interface media devices to DMA 104 through home network 110. Moreover, a varying collection of applications and operating systems distributed throughout home network 110 may work together to provide server functions in the client-server environment to interface media devices to DMA 104.

Figure 2:
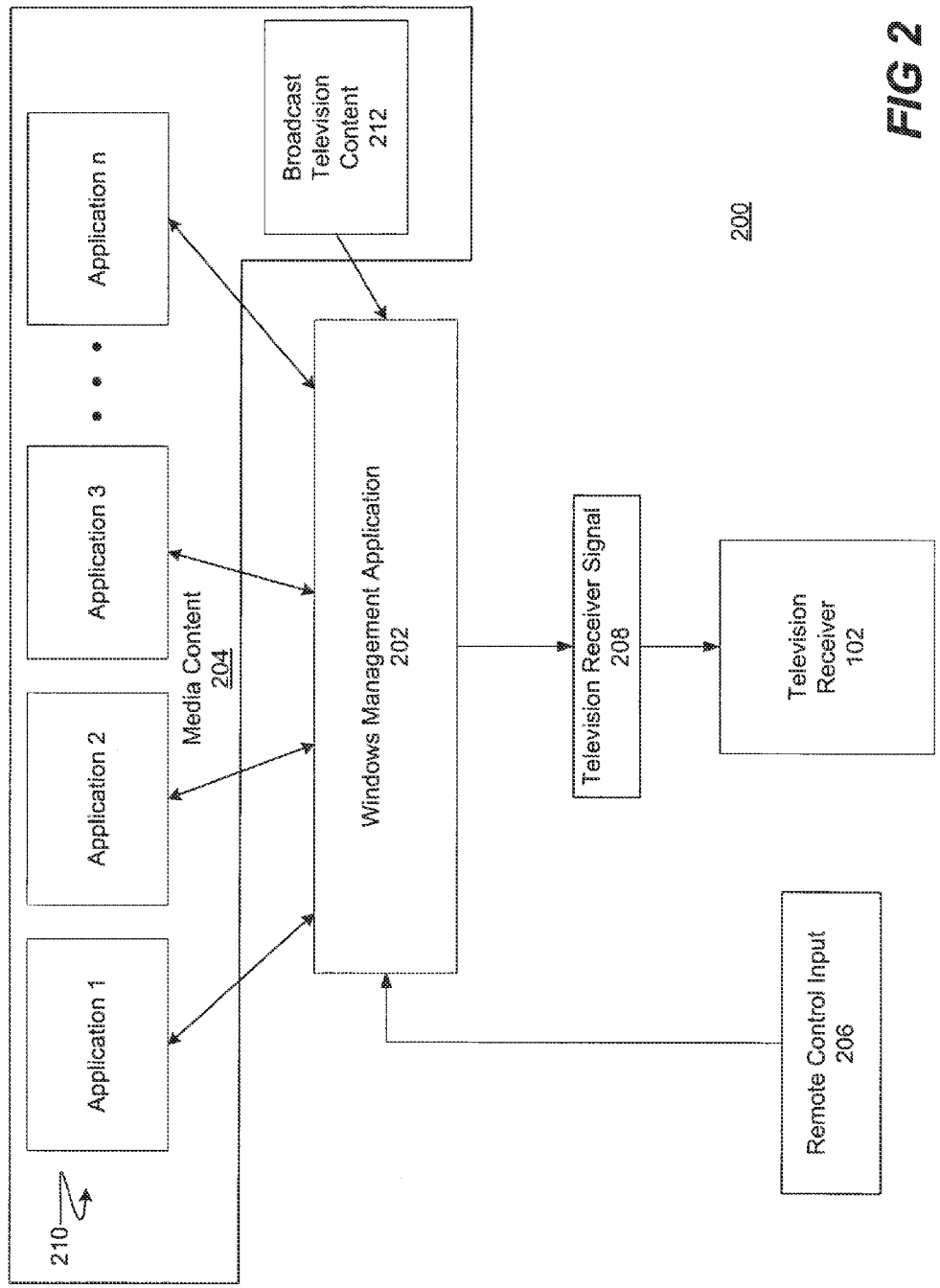
FIG. 2 illustrates one embodiment of a television environment 200.

FIG. 2 illustrates one embodiment of a television environment 200. Television environment 200 includes a windows management application 202, television 102, and media content 204. FIG. 2 is described in relation to FIG. 1 which show elements referred to in FIG. 2.

Windows management application 202 is configured to receive input from various media content 204 and a remote control input 206 to produce television signal 208. Media content 204 includes application content 210 and broadcast television content 212. Application content 210 may include content from one or more applications, such as application 1, application 2, and application 3 through application n. In some embodiments, windows management application 202 does not permit data-sharing between applications. In some embodiments, windows management application 202 is a client in a client-to-client network and is capable of concurrent execution of two or more tasks (multitasking).

In one embodiment, windows management application 202 is part of DMA 104 of FIG. 1. When used in connection with DMA 104, an application may run in three display states: full screen, windowed, and multiple windows. In full screen state, the navigation/interface scheme of the application takes precedent over controls of DMA 104. In windowed state, the application is displayed as a scaled version of the full screen state. In multiple windows state, applications are displayed side by side or in other arrangements such as picture-in-picture. In multiple windows state, applications have a focus control to allow the user to control which window has the focus of the input.

The windows management application 202 combines/composites media content from two or more sources to produce the television signal 208. For example, the windows management application 202 may combine/composite broadcast television content 212 with first application content to produce the television signal 208. As a further example, the windows management application 202 may combine/composite first application content with second application content to produce the television signal 208. The windows management application 202 configures the television signal 208 to display different media content in different windows/panels. For example, the windows management application 202 may configure the television signal 208 so that broadcast television content 212 is displayed in a first window and first application content is displayed in a second window. As a further example, the windows management application 202 may configure the television signal 208 so that first application content is displayed in a full screen and second application content is displayed overlaying the first application content in a partial screen.

To add to the functionality of television 102, windows management application 202 implements a graphical user interface (GUI) on television 102, through which a user can interact with the windows management application 202 and select various operations to be performed. For example, the user may use an input device (e.g., remote control 106) to input information to the windows management application 202 through the graphical user interface (GUI) displayed on the screen 108 of the television 102. Through the graphical user interface, the user may select icons and/or menu items and select media content for various windows to be displayed on the screen 108. Through the graphical user interface, the user may also interact with the various windows displayed on the screen 108 (e.g., to select and move/position a particular window on the screen 108). In some embodiments, the multiple displayed windows may be moved around by the user independently on the screen 108 and may overlap one another.

In one embodiment, an application is run to present media content 204 to television 102. The application may operate as part of windows management application or as one or more applications in the set of applications 210. For this implementation, a server remotes a user interface for the application to the client, here DMA 104. In one embodiment, the server remotes the user interface of an application to DMA 104 via an open standard protocol (e.g., XRT). The DMA 104 client, interpreting the remote application, implements the user interface on television 102 by rendering user interface screens on screen 108 of television 102 and interprets commands from remote control input 206. Unlike the typical two-foot user interface of a computer station, the user of television environment 200 may be ten feet away from the user interface displayed on screen 108 of television 102 and the interface may be formatted accordingly.

Figure 3:
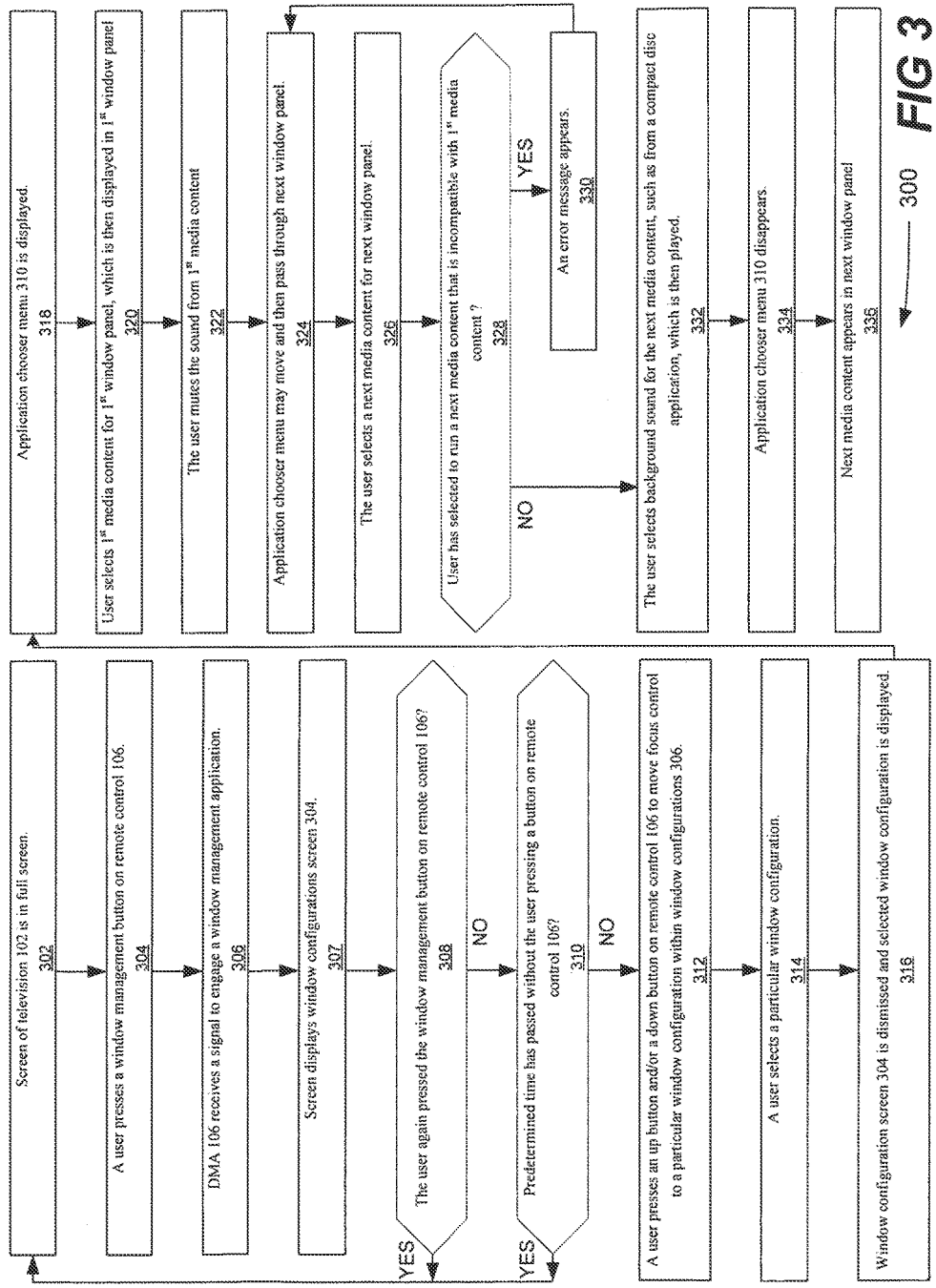
FIG. 3 is a method 300 to manage windows in television environment 100.

FIG. 3 is a method 300 to manage windows in television environment 100. Some steps of the method 300 may be implemented in hardware or software, for example, by the DMA or windows management application. In some embodiments, the method 300 is implemented through use of a GUI displayed on a television 102 that receives input from a user through use of a remote control 106. FIG. 3 is described in relation to FIGS. 1 and 2 which show elements referred to in FIG. 3. Also, FIG. 3 is described in relation to FIGS. 4A-F and 5A-I which illustrate examples of the steps of the method 300. The steps of the method 300 are for illustrative purposes only and the order or number of steps may vary in other embodiments.

Figure 4:
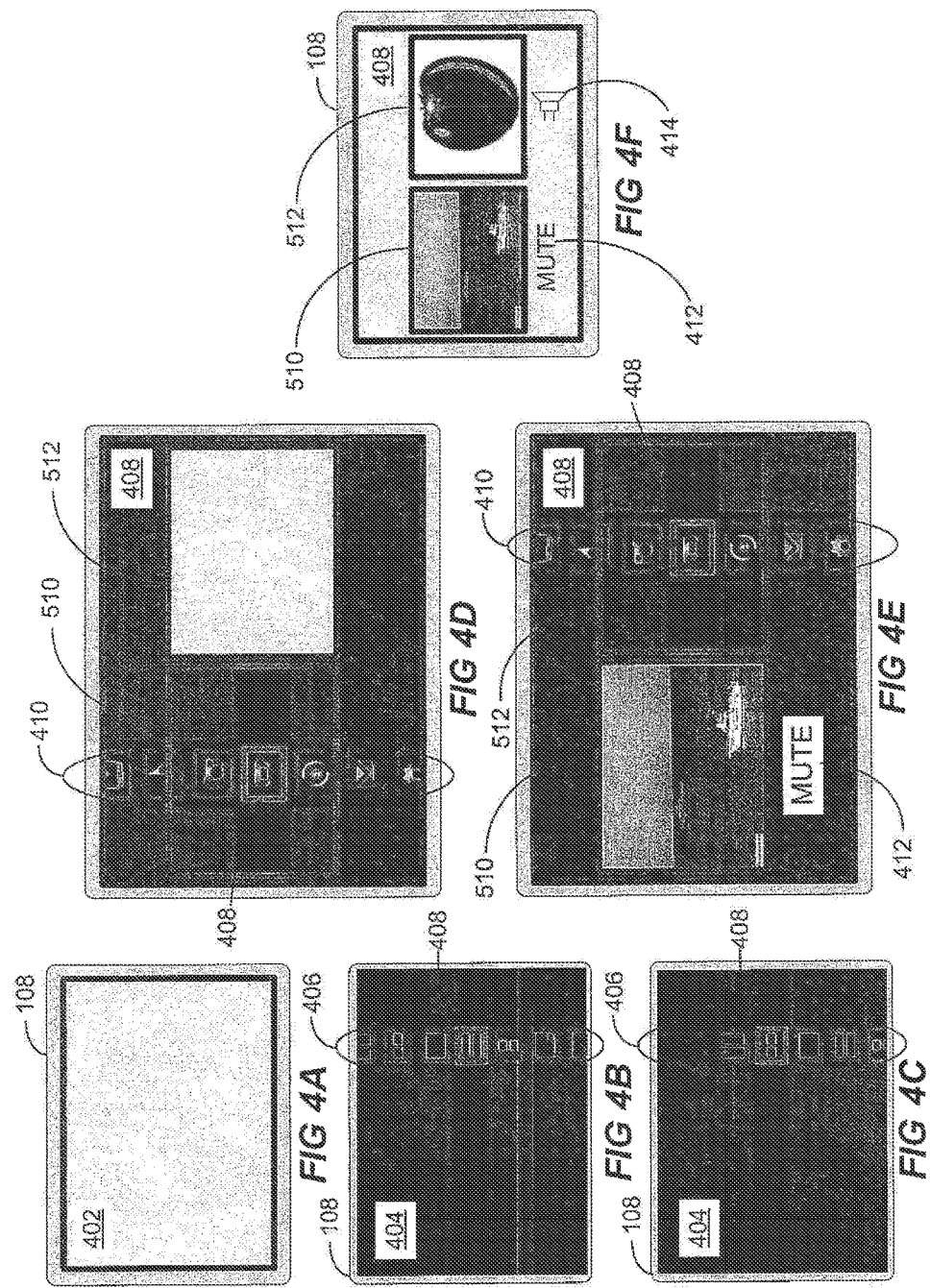
FIG. 4A is a plan view of screen 108 of television 102 in full screen 402.
FIG. 4B is a plan view of window configurations screen 404.
FIG. 4C is a plan view of focus control 408 movement from its position in FIG. 4B to its position in FIG. 4C.
FIG. 4D is a plan view of window configuration 508 displaying application chooser menu 410.
FIG. 4E is a plan view illustrating an application running in window panel 510 and application chooser menu 410 passing through window panel 512.
FIG. 4F is a plan view of window configuration 508 after exit from application chooser menu 410.

The method 300 begins at 302 where media content is displayed on screen 108 of television 102 in full screen mode. FIG. 4A shows an example of screen 108 of television 102 displaying in full screen mode 402. A user may, for example, view television broadcast content on screen 108 in full screen mode. At step 304, a user presses a window management button on remote control 106. In turn, at 306, DMA 104 receives a signal to engage a window management application.

At step 307, screen 108 displays a window configurations screen (where a sound emanating from DMA 104 may indicate this change of screens). FIG. 4B shows an example of a window configurations screen 404. The window configurations screen 404 includes a set of predetermined window configurations 406. FIGS. 5A-I (discussed below) show examples of possible predetermined window configurations 406 that may be displayed at step 307. In some embodiments, a focus control 408 falls upon a window configuration 406 positioned along a horizontal center line of window configurations screen 404. In some embodiments, the window management application 202 may bring to the horizontal center line the window configuration 406 having the most use based on prior selections. As shown in FIG. 4B, windows management application 202 provides a variety of window configurations 406 from which to choose. In some embodiments, each window configuration 406 comprises two or more windows that are positioned and sized according to predetermined settings for the window configuration.

After step 307, the method 300 then determines at step 308 whether the user again pressed the window management button on remote control 106. If so, the window manager application is dismissed and method 300 returns to step 302 to display a prior window configuration on the television screen 108. If not, the method 300 determines at step 310 whether a predetermined amount of time has passed without the user pressing a button on remote control 106. In one embodiment, this is determined by determining whether DMA 104 has received a signal from remote control 106. The predetermined amount of time may be, for example, thirty seconds, one minute, or a time set by the user. If the predetermined amount of time has passed without the user pressing a button on remote control 106, the method 300 returns to step 302. If not, the method 300 proceeds to step 312.

In some embodiments, at each step in method 300, method 300 may determine whether the user pressed the window management button on remote control 106 a second time and determine whether the predetermined amount of time has passed without the user pressing a button on remote control 106. In these embodiments, if either of these conditions exists at any step in method 300, the window manager application is dismissed and method 300 returns to step 302. In returning to step 302, the window manager application may fade out and focus control restored to the previous application.

At step 312, a user may press a navigation button (eg. an up or down button) on remote control 106 to move focus control 408 to a particular window configuration 406 within window configurations screen 404. FIG. 4C shows an example of a focus control 408 movement from its initial position in FIG. 4B to a new position in FIG. 4C. Each time focus control 408 highlights a particular window configuration 406, a sound may play. The sound may be unique to each window configuration so that the user may select a particular window configuration based on sight, sound, or a combination of sight and sound.

At step 314, a user selects a particular window configuration 406 in the window configurations screen 404 using the remote control 106. In response, at step 316, the window configuration screen 404 is dismissed (i.e., no longer displayed on the screen 108) and the selected window configuration is displayed. For example, if the user selects a side-by-side window configuration 508 of FIG. 5B (discussed below in relation to FIG. 5B), window configuration screen 404 is dismissed and window configuration 508 is displayed at step 316. FIG. 4D shows an example of how selected window configuration 508 can be displayed in some embodiments.

In addition, selecting a window configuration at step 314 causes an application chooser menu to be displayed at step 318. Application chooser menu displays icons (or other identifying information) for and provides a selection of different media content 204 for each window panel of a selected window configuration. Examples of media content include content from a second television, music, digital photos, a video player, a videocassette recorder, and applications available over the internet such as email. In general, any content capable of being displayed on television 102 may be included as media content in the application chooser menu. The various media content selectable through the application chooser menu may be configured by user or may be preset by the manufacturer of the DMA.

FIG. 4D shows an example of how an application chooser menu 410 can be displayed in some embodiments. As illustrated in FIG. 4D, application chooser menu 410 passes through (i.e., overlaps) a particular window panel of the selected window configuration to indicate that the particular window panel will receive and display the next selected media content 204. In the example of FIG. 4D, application chooser menu 410 passes through left window panel 510 to indicate that window panel 510 will receive the next selected media content 204.

After the application chooser menu is displayed at step 318, the user then selects at step 320 a first media content for a first window panel of the selected window configuration, the selected first media content then being displayed in the first window panel. FIGS. 4D-E show an example of media content from a digital movie application being selected and then displayed in the left window panel 510.

Optionally, at step 322, the user may mute the sound from the first media content. If the user does so, a text "mute" 412 (as shown in the example of FIG. 4E) may appear below the first window panel to indicate that the sound has been turned off for the media content running in the first window panel. Alternatively, a muted icon may show briefly just after a window panel is set to a muted state. In one embodiment, pressing an audio button on remote control 106 mutes and un-mutes a window panel with action. The muting and un-muting may also be performed by selecting arrow keys of onscreen buttons. Both window panels may be muted, only one window may have audio, and/or both window panels may have audio playing at the same time.

After step 322, the application chooser menu 410 moves and, in one embodiment, then passes through (i.e., is displayed as overlapping) a next window panel of the selected window configuration at step 324. This indicates that the next window panel is to receive the next selected media content 204. FIGS. 4D-E show an example of application chooser menu 410 moving from the first window panel 510 and then passing through the next window panel 512.

At step 326, the user then selects a next media content 204 for a next window panel of the selected window configuration. There may be instances where a selected next media content 204 is incompatible or in conflict with a first media content 204 already selected for display at step 320 (e.g., if the user wishes to run two media contents concurrently that hardware will not allow to run concurrently). As such, at step 328, the method 300 determines whether the user has selected a next media content that is incompatible with the selected first media content. If so, an error message appears in the next window panel at step 330 (e.g., "You cannot play two video clips at the same time") and returns to step 324.

If the user has not selected to run two incompatible media contents 204, then method 300 proceeds to step 332. At step 332, the user selects background sound for the selected next media content (e.g., digital photo), such as from a compact disc application, the selected background sound then being played. Note that the selected background sound can later be muted. On finalizing the media content selection for the window panels of the selected window configuration, application chooser menu 410 disappears at step 334 and the next media content is displayed in the next window panel at step 336. The method 300 then ends.

FIG. 4F shows an example of where the selected next media content is content from a digital photo application (the content being a digital photo of a drawing of a tomato). As shown in FIG. 4F, the application chooser menu 410 is no longer displayed, a digital movie is playing in window panel 510 (with the sound muted as indicated by mute text 412), and a digital image of a tomato is displayed in window panel 512 (with background sound being played as indicated by sound icon 414). At this point, window panel 510 and window panel 512 may be selected and moved around on the television screen 108 by the user and may overlap.

FIGS. 5A-I show examples of possible predetermined window configurations 406 that may be displayed at step 307 and selected at step 314 of method 300. FIGS. 5A-I are for illustrative purpose only and, in other embodiments, other window configurations other than those shown in FIGS. 5A-I are used.

Figure 5:
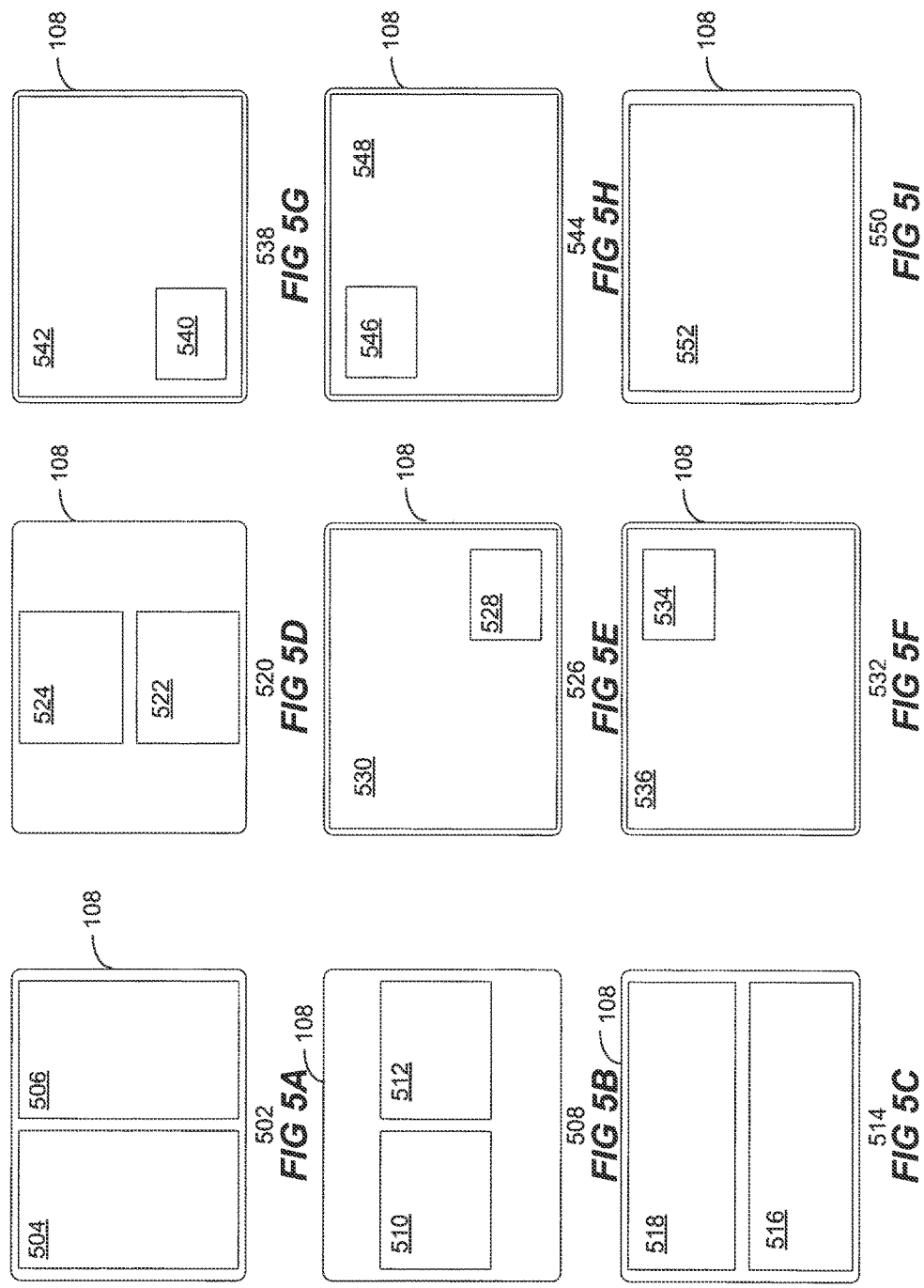
FIG. 5A is a plan view of a first side-by-side window configuration 502.
FIG. 5B is a plan view of a second side-by-side window configuration 508.
FIG. 5C is a plan view of a first over and under window configuration 514.
FIG. 5D is a plan view of a second over and under window configuration 520.
FIG. 5E is a plan view of a first picture in picture window configuration 526.
FIG. 5F is a plan view of a second picture in picture window configuration 532.
FIG. 5G is a plan view of a third picture in picture window configuration 538.
FIG. 5H is a plan view of a fourth picture in picture window configuration 544.
FIG. 5I is a plan view of a full screen window configuration 550.

FIG. 5A shows a plan view of a first side-by-side window configuration 502 comprising a first window panel 504 positioned next to a second window panel 506 in a side-by-side arrangement. To maximize the use of the screen area of screen 108, an aspect ratio of window panels 504 and 506 is compressed horizontally. In other embodiments, the window panels 504 and 506 may be uncompressed horizontally and the application content reformatted to produce a different layout (e.g., for alerts or HTML display the panels may simply reformat the output rather than compress the image).

FIG. 5B is a plan view of a second side-by-side window configuration 508 comprising a first window panel 510 positioned next to a second window panel 512 in a side-by-side arrangement. To be more true to the intended display size of an application, an aspect ratio of at least one of window panel 510 and window panel 512 is the same as the aspect ratio established by the content provider. In other words, the aspect ratio is neither compressed nor expanded from the original aspect ratio.

FIG. 5C is a plan view of a first over and under window configuration 514 comprising a first window panel 516 positioned next to a second window panel 518 in an over and under arrangement. To maximize the use of the screen area of screen 108, an aspect ratio of window panel 514 and window panel 516 is compressed vertically. In other embodiments, the window panels 514 and 516 may be uncompressed vertically for application content to produce a different layout for text (e.g., for alerts or HTML the panels may resize rather than compress).

FIG. 5D is a plan view of a second over and under window configuration 520 comprising a first window panel 522 positioned next to a second window panel 524 in an over and under arrangement. To be more true to the intended display size of an application, an aspect ratio of at least one of window panel 522 and window panel 524 is the same as the aspect ratio established by the content provider.

FIG. 5E is a plan view of a first picture in picture window configuration 526 comprising a first window panel 528 positioned within a second window panel 530 in a picture in picture arrangement. Window panel 528 is located in a lower right corner of window panel 530. FIG. 5F is a plan view of a second picture in picture window configuration 532 comprising a first window panel 534 positioned in an upper right corner within a second window panel 538 in a picture in picture arrangement. FIG. 5G is a plan view of a third picture in picture window configuration 538 comprising a first window panel 540 positioned in a lower left corner within a second window panel 542 in a picture in picture arrangement. FIG. 5H is a plan view of a fourth picture in picture window configuration 544 comprising a first window panel 546 positioned in an upper right corner within a second window panel 548 in a picture in picture arrangement. In some embodiments, an aspect ratio of at least one window panel in window configuration 526, window configuration 532, window configuration 538, and window configuration 544 is the same as the aspect ratio established by the content provider.

FIG. 5I is a plan view of a full screen window configuration 550 comprising a window panel 552 positioned to fill screen 108 in a full screen arrangement. A viewer looking at television 102 may see television broadcast content that fills window panel 552. Window configuration 552 of FIG. 5I includes some similarities to full screen 402 of FIG. 4A and may be displayed as an initial window configuration at step 302 of FIG. 3.

Figure 6:
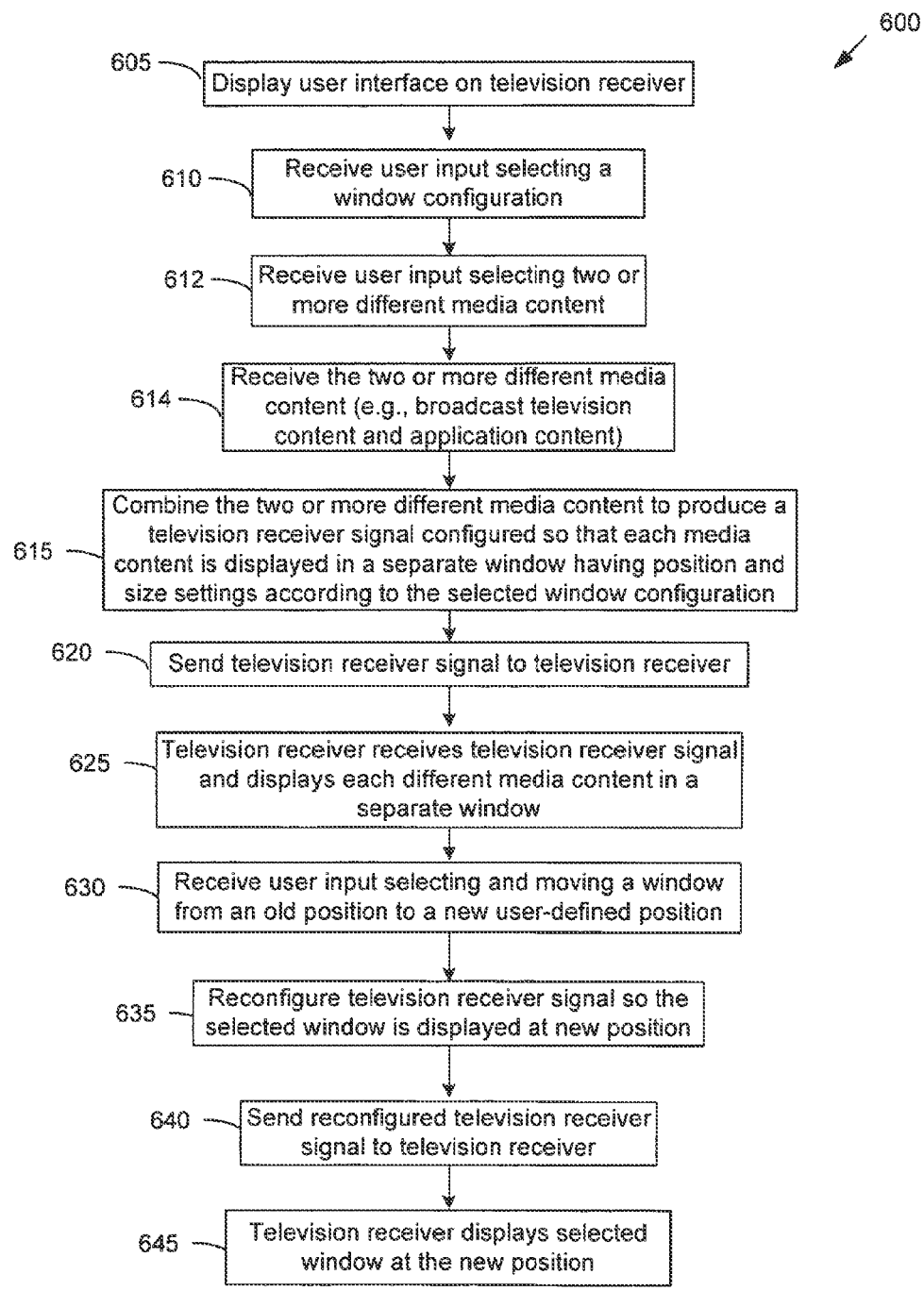
FIG. 6 is a method to display windows in television environment 100.

FIG. 6 is a method 600 for displaying windows in television environment 100. Some steps of the method 600 may be implemented in hardware or software, for example, by a DMA or windows management application that receives user input through a user interface (e.g., through use of the remote control). The steps of the method 600 are for illustrative purposes only and the order or number of steps may vary in other embodiments. FIG. 6 is described in relation to FIGS. 1 and 2 which show elements referred to in FIG. 6.

The method 600 begins when the windows management application displays (at 605) a user interface on the screen 108 of the television 102. The windows management application then receives (at 610) user input selecting a particular window configuration having predetermined position and size settings for one or more windows. The windows management application also receives (at 612) user input selecting media content for display in the windows. The windows management application then receives (at 614) the media content. In some embodiments, the windows management application receives (at 610) user input selecting settings for two or more windows, receives (at 612) user input selecting two or more different media content, and receives (at 614) two or more different media content. In some embodiments, the media content comprises at least a first broadcast television content 212 and at least a first application content.

The windows management application then combines/composites (at 615) the two or more different media content to produce a television signal 208 and configures the television signal 208 so that each separate media content is to be displayed in a separate window on the screen 108 of the television 102. The separate windows for the separate media content are also configured according to the position and size settings for the particular window configuration selected at step 610. The windows management application sends (at 620) the television signal 208 to the television 102. The television 102 receives (at 625) the television signal 208 and displays it on the screen 108. In some embodiments, the television 102 displays (at 625) each of two or more different media content in a separate window/panel on the screen 108.

The windows management application then receives (at 630) user input selecting and moving a window displayed on the screen 108 from an old position (the predetermined position as set by the selected window configuration) to a new user-defined position on the screen 108. In response, the windows management application reconfigures (at 635) the television signal 208 so that the selected window is displayed at the new user-defined position on the screen 108. In some embodiments, the television signal 208 is configured so that the new position of the selected window overlaps the position of another window displayed on the screen 108. The windows management application sends (at 640) the reconfigured television signal 208 to the television 102 and the television 102 displays (at 645) the selected window at the new position on the screen 108. In some embodiments, the selected window is displayed to overlap another window on the screen 108.

As discussed above, high definition televisions (HDTV) provide more resolution than standard definition televisions. Currently though, there is a small amount of high definition media content 204 that takes advantage of the greater resolution provided by high definition televisions. However, with the advent of remoted applications, a large suite of applications have become available providing a variety of media content 204 to a user.

In some embodiments described above, DMA 104 provides picture-in-picture and picture-by-picture options where the user selects from a variety of media content 204. Some embodiments give the user more flexibility when watching television making the viewing experience similar to that of a personal computer, but in a more television-centric way. For example, the user may interact with window panels (e.g., via a remote control) to move window panels around on the television screen 108 and overlap window panels. Through DMA 104, the user has access to content from multiple applications and content from multiple broadcast television signals concurrently. Some embodiments described above combine (i) applications that may be available on a personal computer, (ii) broadcast television content, and (iii) a user interface that makes sense on a television and with which a television viewer is familiar. In doing so, a user now is provided with the ability to control two or more different media content 204 on a television screen 108.

FIG. 7 is a computer system 700 with which some embodiments of the invention are implemented. In some embodiments, the techniques of the present invention is hard-coded into hardware devices dedicated specifically for graphics production and/or implemented in computer executable instructions stored in a computer readable medium (software).

The computer system 700 may include a bus 705, a processor 710, a system memory 715, a read-only memory 720, a permanent storage device 725, input devices 730, output devices 735, and an alternative processor 740. Some or all of the items of computer system 700 is included in a compiling unit or included in a control processor.

The bus 705 may collectively represent all system, peripheral, and chipset buses that communicatively connect the numerous internal devices of the computer system 700. For instance, the bus 705 may communicatively connect the processor 710 with the read-only memory 720, the system memory 715, and the permanent storage device 725.

The read-only-memory (ROM) 720 may store static data and instructions that is needed by the processor 710 and other modules of the computer system. The permanent storage device 725, on the other hand, is a read-and-write memory device. This device is a non-volatile memory unit that stores instruction and data even when the computer system 700 is off. Some embodiments of the invention may utilize a mass-storage device (such as a magnetic or optical disk and its corresponding disk drive) as the permanent storage device 725. Other embodiments may utilize a removable storage device (such as a floppy disk or Zip® disk, and its corresponding disk drive) as the permanent storage device.

Like the permanent storage device 725, the system memory 715 is a read-and-write memory device. However, unlike storage device 725, the system memory is a volatile read-and-write memory, such as a random access memory (RAM). The system memory may store some of the instructions and data that the processor needs at runtime.

In some embodiments, instructions and/or data needed to perform methods of the present invention is stored in the system memory 715, the permanent storage device 725, the read-only memory 720, or any combination of the three. For example, the various memory units may contain instructions of an application and/or graphics data generated by the application. In some embodiments, the system memory 715 and/or the permanent storage device 725 may comprise a cache and/or buffer.

From these various memory units, the processor 710 may retrieve instructions to execute and data to process to perform the processes of the present invention. In some embodiments, the processor 710 may utilize an on-chip cache 712 to hold data recently accessed or produced by the processor 710. In some embodiments, the alternative processor 740 may execute instructions and processes data to perform the processes of the present invention.

The bus 705 also may connect to the input and output devices 730 and 735. The input devices 730 may enable a user to communicate information and select commands to the computer system 700. The input devices 730 may include alphanumeric keyboards and cursor-controllers. The output devices 735 may print or display images generated by the computer system 700. The output devices may include printers and display devices, such as cathode ray tubes (CRT) or liquid crystal displays (LCD).

Finally, as shown in FIG. 7, the bus 705 also may couple the computer system 700 to a network 775 through, for example, a network adapter (not shown). In this manner, the computer system 700 is a part of a network of computers (such as a local area network ("LAN"), a wide area network ("WAN"), or an Intranet) or a network of networks (such as the Internet). Any or all of the components of the computer system 700 is used in conjunction with the present invention. However, one of ordinary skill in the art would appreciate that any other system configuration also is used in conjunction with the present invention.

Those of skill would appreciate that the various illustrative logical blocks, modules, circuits, and algorithm steps described in connection with the embodiments disclosed herein is implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Moreover, method steps is interchanged without departing from the scope of the invention.

The various illustrative logical blocks, modules, and circuits described in connection with the embodiments disclosed herein is implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor is a microprocessor, but in the alternative, the processor is any conventional processor, controller, microcontroller, or state machine. A processor also is implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein is embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor reads information from, and writes information to, the storage medium. In the alternative, the storage medium is integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or utilize the present invention. Various modifications to these embodiments will be readily apparent to those skilled in the art, and the generic principles defined herein is applied to other embodiments without departing from the spirit or scope of the invention. Thus, the present invention is not intended to be limited to the embodiments shown herein but is to be accorded the widest scope consistent with the principles and novel features disclosed herein. Thus, one of ordinary skill in the art would understand that the invention is not to be limited by the foregoing illustrative details, but rather is to be defined by the appended claims.

What is claimed is:

1. A method implemented on processing circuitry for managing windows displayed on a display device, the method comprising:
    receiving a user input selecting a first audio-visual media stream available from a first source;
    determining whether the first audio-visual media stream is compatible with a second audio-visual media stream from a second source;
    in response to determining that the first audio-visual media stream is compatible with the second audiovisual media stream:
        generating for display, in a first display configuration, the second audio-visual media stream, available from the second source, overlaid in a corner portion of the first audio-visual media stream; and
        in response to a user request, generating for display the first audio-visual media stream and the second audio visual media stream in a second display configuration different from the first display configuration; and
    in response to determining that the first audio-visual media stream is not compatible with the second audio-visual media stream, generating for display an indication indicating that the first audio-visual stream is not compatible with the second audio-visual stream.

2. The method of claim 1, wherein the first audio-visual media stream and the second audio-visual media stream each comprise one of television content, interactive media content, multimedia application content, and internet-based application content.

3. The method of claim 1, further comprising:
    after generating for display the first audio-visual media stream with the second audio-visual media stream in the first display configuration, receiving a user input moving the second audio-visual media stream to a new position in a display screen; and
    updating the display screen including the second audio-visual media stream at the new position.

4. The method of claim 3, wherein the user input is received through a user interface displayed on the display device through use of a remote control device.

5. The method of claim 1, wherein generating for display the first audio-visual media stream and the second audio-visual media stream in the second display configuration comprises generating for display at least one of the first audio-visual media stream and the second audio-visual media stream with an aspect ratio equal to an original aspect ratio established by a content provider.

6. The method of claim 1, wherein generating for display the first audio-visual media stream and the second audio-visual media stream in the second display configuration comprises adjusting an aspect ratio equal of at least one of the first audio-visual media stream and the second audio-visual media stream.

7. The method of claim 1, wherein generating for display the first audio-visual media stream and the second audio-visual media stream in the second display configuration comprises reformatting at least one of the first audio-visual media stream and the second audio-visual media stream to fit a display screen.

8. The method of claim 1, further comprising:
receiving a user command to mute at least one of the first audio-visual media stream and the second audio-visual media stream; and
muting the at least one of the first audio-visual media stream and the second audio-visual media stream.

9. The method of claim 8, further comprising receiving a user selection of background sound for at least one of the first audio-visual media stream and the second audio-visual media stream.

10. A system for managing windows displayed on a display device, the system comprising processing circuitry configured to:
receive a user input selecting a first audio-visual media stream available from a first source;
determine whether the first audio-visual media stream is compatible with a second audio-visual media stream from a second source;
in response to determining that the first audio-visual media stream is compatible with the second audiovisual media stream:
generate for display, in a first display configuration, the second audio-visual media stream, available from the second source, overlaid in a corner portion of the first audio-visual media stream; and
generate for display the first audio-visual media stream and the second audio-visual media stream in a second display configuration different from the first display configuration in response to a user request; and
in response to determining that the first audio-visual media stream is not compatible with the second audio-visual media stream, generate for display an indication indicating that the first audio-visual stream is not compatible with the second audio-visual stream.

11. The system of claim 10, wherein the first audio-visual media stream and the second audio-visual media stream each comprise one of television content, interactive media content, multimedia application content, and internet-based application-content.

12. The system of claim 10, wherein the processing circuitry is further configured to:
receive, after generating for display the first audio-visual media stream with the second audio-visual media stream in the first display configuration, a user input moving the second audio-visual media stream to a new position in a display screen; and
update the display screen including the second audio-visual media stream at the new position.

13. The system of claim 12 further comprising a remote control device, wherein the processing circuitry is further configured to receive the user input through a user interface displayed on the display device through use of the remote control device.

14. The system of claim 10, wherein the processing circuitry is further configured to, when generating for display the first audio-visual media stream and the second audio-visual media stream in the second display configuration, generate for display at least one of the first audio-visual media stream and the second audio-visual media stream with an aspect ratio equal to an original aspect ratio established by a content provider.

15. The system of claim 10, wherein the processing circuitry is further configured to, when generating for display the first audio-visual media stream and the second audio-visual media stream in the second display configuration, adjust an aspect ratio equal of at least one of the first audio-visual media stream and the second audio-visual media stream.

16. The system of claim 10, wherein the processing circuitry is further configured to, when generating for display the first audio-visual media stream and the second audio-visual media stream in the second display configuration, reformat at least one of the first audio-visual media stream and the second audio-visual media stream to fit the display screen.

17. The system of claim 10, wherein the processing circuitry is further configured to:
receive a user command to mute at least one of the first audio-visual media stream and the second audio-visual media stream; and
mute the at least one of the first audio-visual media stream and the second audio-visual media stream.

18. The system of claim 17, wherein the processing circuitry is further configured to receive a user selection of background sound for at least one of the first audio-visual media stream and the second audio-visual media stream.

* * * * *